US012608159B2

(12) United States Patent
Segev et al.

(10) Patent No.: US 12,608,159 B2
(45) Date of Patent: Apr. 21, 2026

(54) EFFICIENT SEQUENTIAL WRITE GAP PROCESSING

(71) Applicant: Sandisk Technologies, Inc., Milpitas, CA (US)

(72) Inventors: Amir Segev, Meiter (IL); Shay Benisty, Beer Sheva (IL); David Meyer, Lakewood, CO (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/441,343

(22) Filed: Feb. 14, 2024

(65) Prior Publication Data
US 2025/0258625 A1     Aug. 14, 2025

(51) Int. Cl.
*G06F 3/06* (2006.01)

(52) U.S. Cl.
CPC .......... *G06F 3/0659* (2013.01); *G06F 3/0604* (2013.01); *G06F 3/0656* (2013.01); *G06F 3/0679* (2013.01)

(58) Field of Classification Search
CPC .... G06F 3/0659; G06F 3/0604; G06F 3/0656; G06F 3/0679
See application file for complete search history.

(56) References Cited

U.S. PATENT DOCUMENTS

| | | | |
|---|---|---|---|
| 10,019,196 B2 | 7/2018 | Zaltsman et al. | |
| 10,296,249 B2 | 5/2019 | Benisty | |
| 10,866,740 B2 | 12/2020 | Benisty et al. | |
| 11,372,543 B2 | 6/2022 | Benisty et al. | |
| 11,455,124 B2 | 9/2022 | Agarwal et al. | |
| 11,586,385 B1* | 2/2023 | Lercari | G06F 12/0246 |
| 2017/0285940 A1* | 10/2017 | Benisty | G06F 12/0871 |
| 2021/0223994 A1* | 7/2021 | Kanno | G06F 3/0679 |
| 2023/0229358 A1* | 7/2023 | Xu | G06F 3/061 |
| | | | 711/154 |

* cited by examiner

*Primary Examiner* — Eric Cardwell
(74) *Attorney, Agent, or Firm* — Patterson + Sheridan, LLP

(57) ABSTRACT

Gap processing is utilized to reorder out-of-order submissions on the normal submission queue. The controller is able to process logical block addresses (LBAs) that are received through the use of a normal NVMe submission queue (SQ) and a private SQ. The normal NVMe SQ will store the LBAs of commands that may arrive out of sequential order for processing. The private SQ is used to store an LBA that is received after a gap is detected. The private SQ is only read after a command is received on the normal SQ that contains the current First Gap LBA. If no entry in the private SQ is sequentially after the first gap LBA, no processing of the private SQ occurs. If the pulled LBA is next, then the LBA will be processed by the data storage device. If the pulled LBA is not next, then the zone gap processing will send the LBA back to the private SQ.

20 Claims, 7 Drawing Sheets

500

- If Zone SQ empty
    - o If (rx_lba = prev_lba+1)
        - Requeue cmd to HA
        - Prev_lba = prev_lba + 1
    - o else
        - Write cmd to Zone SQ
        - Set cur_first_gap = prev_lba+1
- Else
    - o If (rx_lba = cur_first_gap)
        - Forward CMD for normal processing
        - Prev_lba = prev_lba + 1
        - fwd_zone_sq_ent = 1
        - For every entry on Zone SQ (not including requeued ones)
            - Read entry
            - If fwd_zone_sq_ent
                - o If (sq_lba = prev_lba+1)
                    - Forward CMD for normal processing
                    - Prev_lba = prev_lba + 1
                - o Else
                    - Cur_first_gap = prev_lba+1
                    - Fwd_zone_sq_ent = 0
                    - Write cmd to zone SQ
            - Else
                - o Write cmd to zone SQ
    - o Else
        - Write cmd to Zone

| RX LBA | PROCESS STEP | Zone SQ Entries | Cur First Gap |
|---|---|---|---|
| 0 | Process normally | | |
| 1 | Process normally | | |
| 2 | Process normally | | |
| 4 | Write to Zone SQ | 4 | 3 |
| 5 | Write to Zone SQ | 4,5 | 3 |
| 7 | Write to Zone SQ | 4,5,7 | 3 |
| 3 | Process normally | | |
| | Read Zone SQ => process 4 | 5,7 | |
| | Read Zone SQ => process 5 | 7 | |
| | Read Zone SQ => Write 7 to Zone SQ | 7 | 6 |
| 8 | Write to Zone SQ | 7,8 | 6 |
| 9 | Write to Zone SQ | 7,8,9 | 6 |
| 6 | Process normally | | |
| | Read Zone SQ => process 7 | 8,9 | |
| | Read Zone SQ => process 8 | 9 | |
| | Read Zone SQ => process 9 | | |

700 ⟶

EFFICIENT SEQUENTIAL WRITE GAP PROCESSING

BACKGROUND OF THE DISCLOSURE

Field of the Disclosure

Embodiments of the present disclosure generally relate to improving logical block address (LBA) processing in devices.

Description of the Related Art

In non-volatile memory express (NVMe) standards, zoned namespaces were introduced in the zoned namespace command set specification. A zoned namespace is written to a memory device (e.g., NAND) in a sequential fashion. That is, the logical block address (LBA) is always incrementing for subsequent writes. Since the NVMe standard does not guarantee ordering of commands, the queue depth (QD) of writes to each zone is limited to one.

Usually in the NAND, the data is not promised to be sequential but the data is written sequentially to the NAND. Writing sequentially is easier to maintain no gaps. There are cases when the host wants to tell the data storage device what zone to put the data in. In other cases when an entire zone is filled, the controller can write the data sequentially to the NAND. Though, until the data reaches the NAND, the host can enforce the order of the data.

Therefore, there is a need in the art for improving processing commands that are received out of sequential order.

SUMMARY OF THE DISCLOSURE

Gap processing is utilized to reorder out-of-order submissions on the normal submission queue. The controller is able to process logical block addresses (LBAs) that are received through the use of a normal NVMe submission queue (SQ) and a private SQ. The normal NVMe SQ will store the LBAs of commands that may arrive out of sequential order for processing. The private SQ is used to store an LBA that is received after a gap is detected. The private SQ is only read after a command is received on the normal SQ that contains the current First Gap LBA. If no entry in the private SQ is sequentially after the first gap LBA, no processing of the private SQ occurs. If the pulled LBA is next, then the LBA will be processed by the data storage device. If the pulled LBA is not next, then the zone gap processing will send the LBA back to the private SQ.

In one embodiment, a data storage device comprises: a memory device; and a controller coupled to the memory device, wherein the controller is configured to: retrieve a first zone write command from a first submission queue (SQ) to write data to a zone, wherein the first zone write command comprises a first logical block address (LBA); determine that the first zone write command would result in a LBA gap within the zone; place the first zone write command in a second SQ; and retrieve a second zone write command from the first SQ, wherein the second zone write command comprises a second LBA.

In another embodiment, a data storage device comprises: a memory device; and a controller coupled to the memory device, wherein the controller is configured to: retrieve a first zone write command comprising a first logical block address (LBA); execute the first zone write command; retrieve a second zone write command comprising a second LBA; determine that execution of the second zone write command would be out of order; place the second zone write command in a submission queue (SQ); retrieve a third zone write command comprising a third LBA; execute the third zone write command; retrieve the second zone write command; and execute the second zone write command.

In another embodiment, a data storage device comprises: means to store data; and a controller coupled to the means to store data, wherein the controller is configured to: determine whether a zone write command create a logical block address (LBA) gap within a zone; place the zone write command in a submission queue (SQ); process other zone write commands; search the SQ for zone write commands that can be executed without creating a LBA gap; and execute zone write commands from the SQ that can be executed without creating a LBA gap.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a diagram illustrating a method for gap processing, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Gap processing is utilized to reorder out-of-order submissions on the normal submission queue. The controller is able to process logical block addresses (LBAs) that are received through the use of a normal NVMe submission queue (SQ) and a private SQ. The normal NVMe SQ will store the LBAs of commands that may arrive out of sequential order for processing. The private SQ is used to store an LBA that is received after a gap is detected. The private SQ is only read after a command is received on the normal SQ that contains the current First Gap LBA. If no entry in the private SQ is sequentially after the first gap LBA, no processing of the private SQ occurs. If the pulled LBA is next, then the LBA will be processed by the data storage device. If the pulled LBA is not next, then the zone gap processing will send the LBA back to the private SQ.

Figure 1:
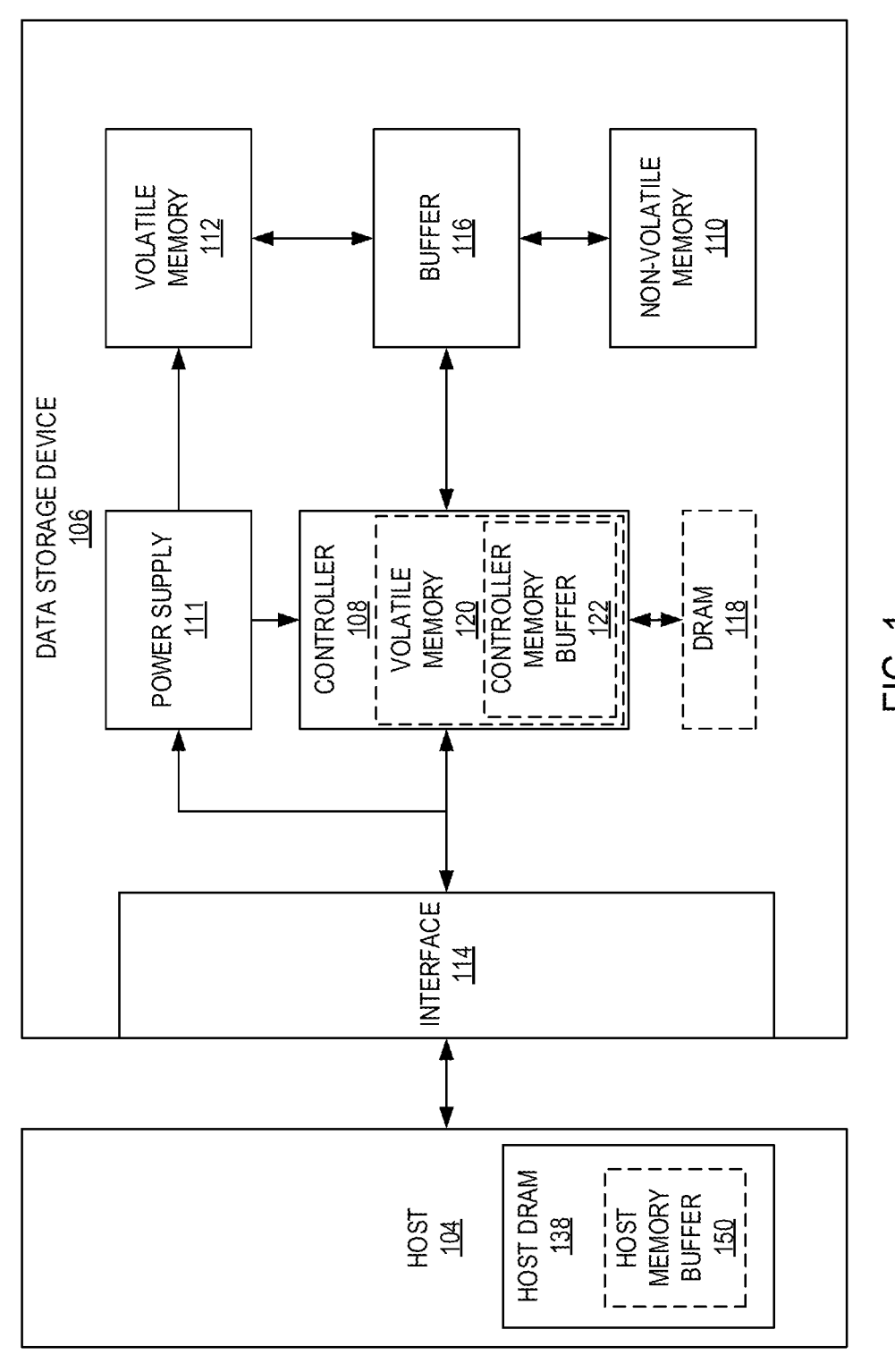
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
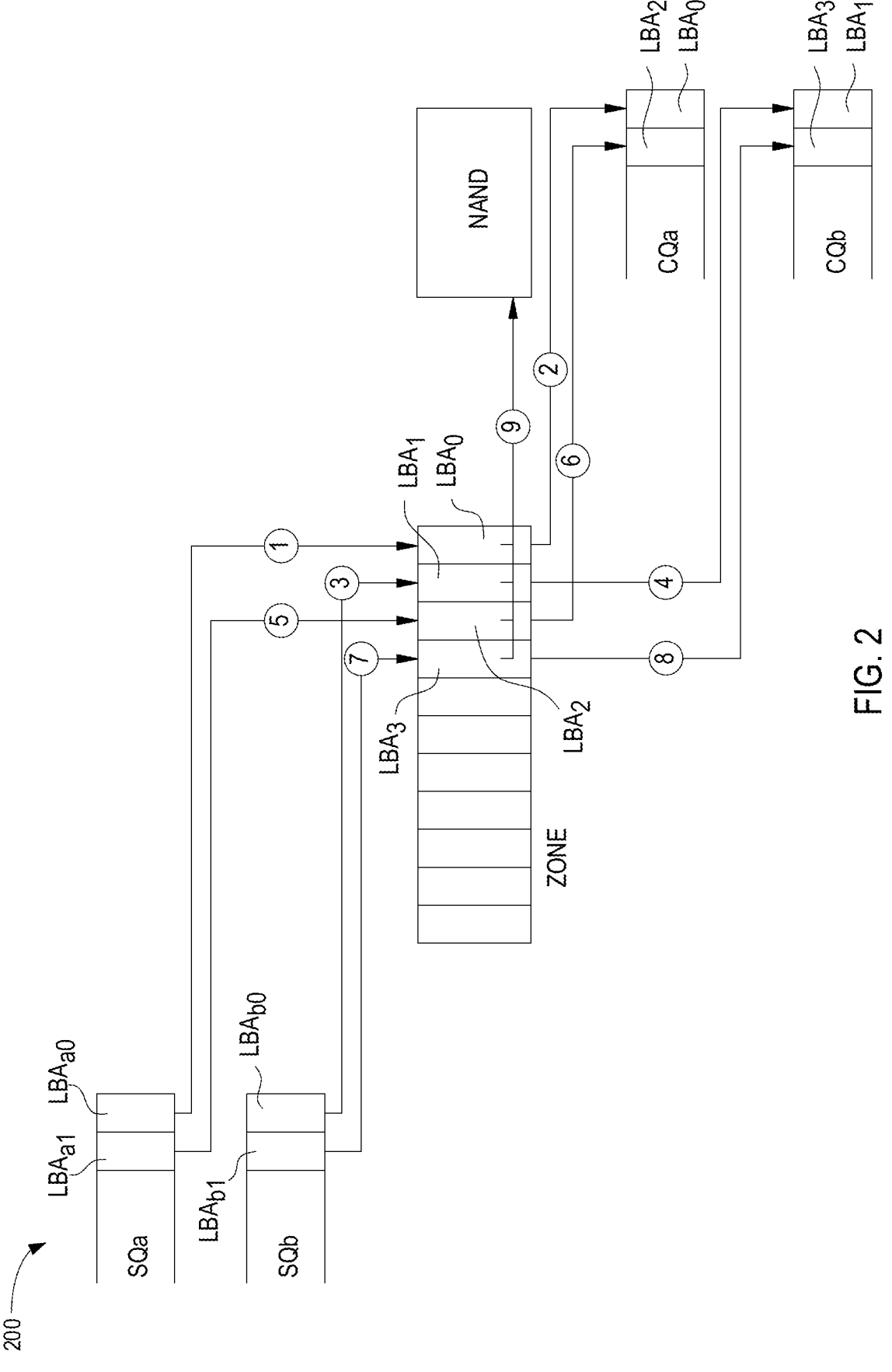
FIG. 2 is a block diagram illustrating a system for a zone append write operation, according to one embodiment.

FIG. 2 is a block diagram illustrating a system 200 for a zone append write operation, according to one embodiment. A zoned append command is different from a regular write command. A zone append command is when data is written, but to the last sequential area available. The controller decides what LBA the data goes to. In the system 200, the order in which the controller receives the commands doesn't matter because the controller can treat the data sequentially. During a normal write command the order cannot be controlled.

The zone append command was added in the zoned namespace command set specification to allow multiple hosts to simultaneously write LBAs to a single sequential NAND zone. The simultaneous writing is done in an asynchronous manner via one or more submission queues (SQ) and with a QD greater than one.

Each host communicates with the data storage device via dedicated sets of SQs and completion queues (CQ). Assuming that the data storage device processes the SQs in round robin fashion, the LBAs from each host will be interleaved in the sequential zone. As the data storage device processes each command, the data storage device assigns a sequential address to each logical block. The resulting LBA is communicated to the host in the CQ entry that is written upon command processing the completion. When a sequential write chunk of data is collected, the write chunk is written to the memory device (e.g., NAND) and the internal resources associated with the commands in the chunk may be released. For simplicity, the write chunk size is two in the system 200.

Figure 3:
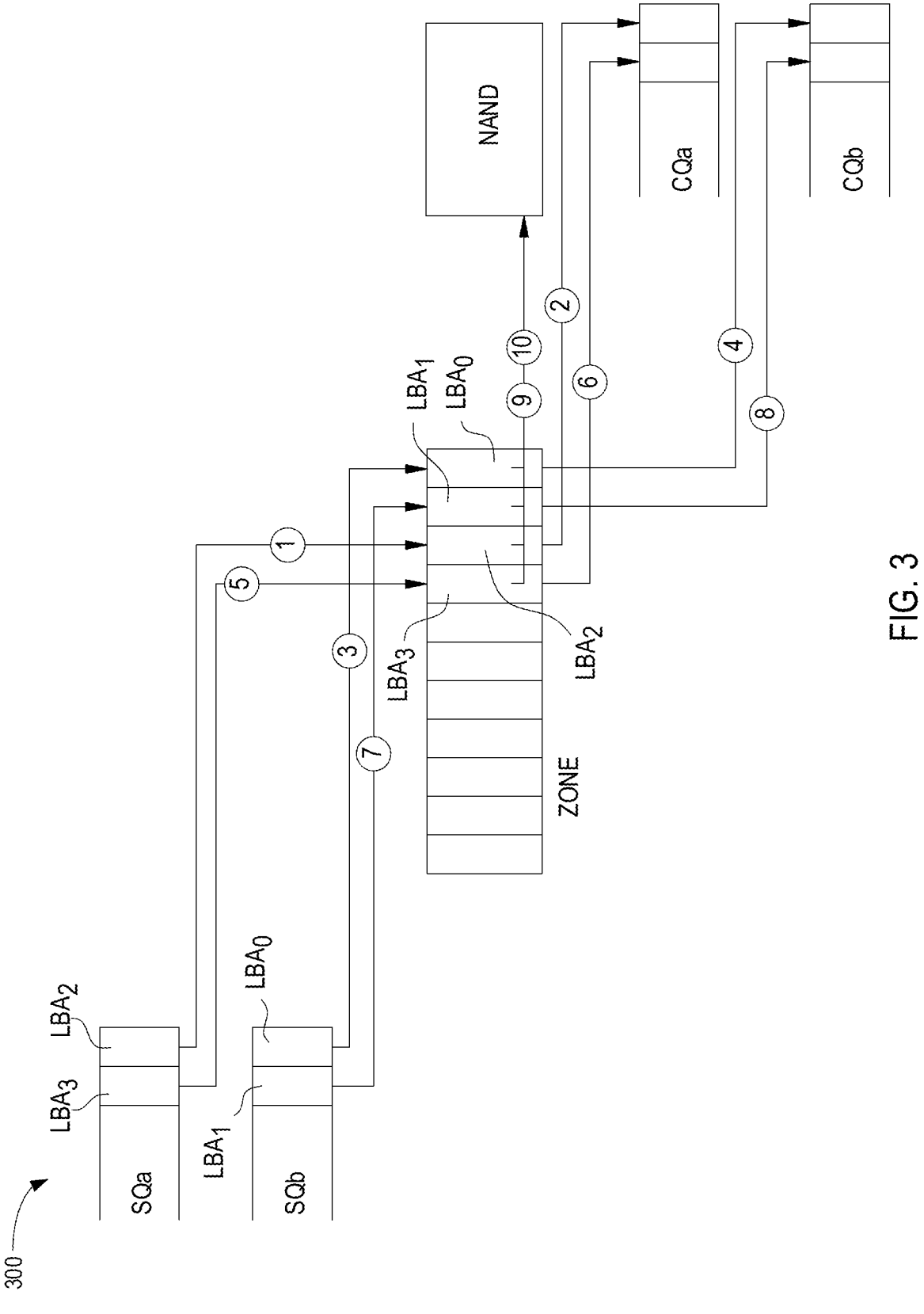
FIG. 3 is a block diagram illustrating a system for a zone random write operation, according to one embodiment.

FIG. 3 is a block diagram illustrating a system 300 for a zone random write operation, according to one embodiment. The controller should wait for the entire data to arrive before writing the data to the memory device (e.g., NAND). If the controller doesn't wait, then the controller loses the benefit of writing sequentially to the memory device (e.g., NAND). The device will pay later on with things such as garbage collection, and garbage collection is utilized for other provisioning's. In general, to be efficient with the memory device (e.g., NAND), the controller should write data sequentially and to the entire zone. If the host decides on the addresses of each command, then the data storage device doesn't know where to fetch each of the commands. As a result the data storage device might fetch a command, which can lead to data arriving to the device out of order.

There is a question of how long or how much data can be kept in the data storage device to compensate for gaps. Again, before writing to the memory device (e.g., NAND), the data storage device should have all the data that should be written. Or at least to have no gaps, because writing sequentially there cannot be any gaps. Maybe there is more data proceeding, but if there are gaps, the controller can't write LBA 3 before writing LBA 0, LBA 1, and LBA 2. For example, let's say that the controller fetches LBA 3 first. The device should make sure in advance that there is enough room for LBA 0, LBA 1, and LBA 2 before actually writing LBA 3 to the memory device (e.g., NAND). That will keep a lot of buffers for future writes.

An NVMe technical proposal requests that the write command to a sequential zone be modified to allow a QD greater than one and that the write commands from one or more hosts and/or SQs can be in random address order. In this case, the host will be providing the address of each LBA in the command. Since order is not quarantined or multiple hosts may be writing asynchronously, gaps may be introduced in the zone processing that will prevent the zone from being written to the memory device (e.g., NAND).

Again, the SQs are processed in round robin fashion. Because of this, a temporal gap is formed between LBA 0 and LBA 2 in the zone. Only after LBA 0 arrives can both write chunks proceed to be written to the memory device (e.g., NAND) and all internal resources associated with the commands are released. An issue that is introduced is that command processing will be held off when a gap in the LBAs is detected. These commands will consume internal resources until a command arrives that fills the gap. These resources include, but are not limited to, command indexes and data buffers.

As will be discussed herein, limiting the internal resources to delay processing of commands after a gap in the sequential stream is detected is disclosed herein. The disclosure discussed configuring a private NVMe compliant SQ in either a NVMe HMB or in memory, such as DDR memory, directly attached to the controller. A SQ can be configured for each zone supported.

Figure 4:
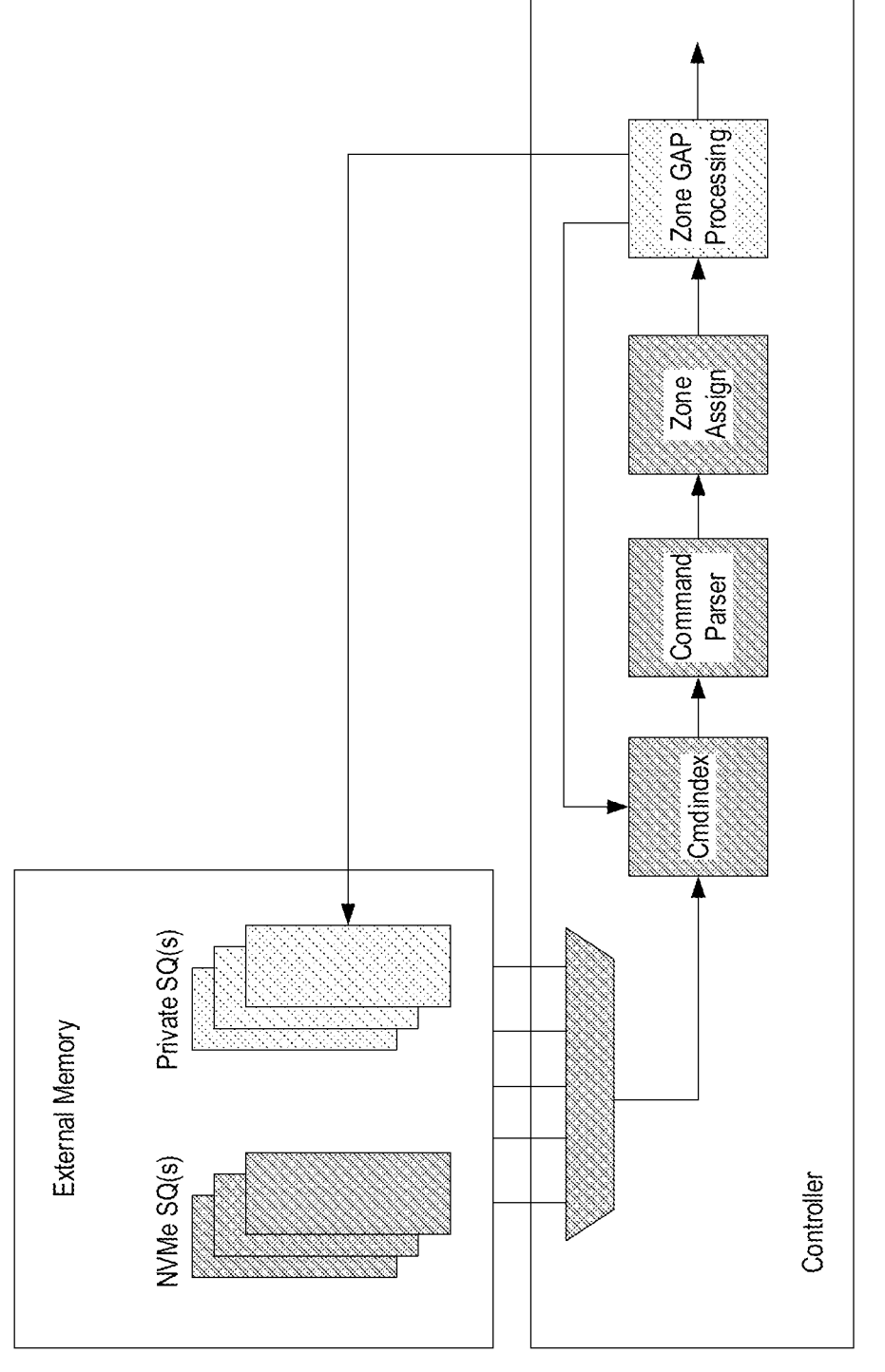
FIG. 4 is a block diagram illustrating a system for a solid state drive (SSD) controller with zone gap processing, according to one embodiment.

FIG. 4 is a block diagram illustrating a system 400 for a SSD controller with zone gap processing, according to one embodiment. The system 400 comprises an external memory comprising NVMe SQs and private SQs. The system 400 further comprises a controller. The controller comprises of a command index assign module, a command parser module, a zone assignment function module, and a zone gap processing module. The use of the private SQ per zone and zone gap processing is different from a regular write command process.

The zone gap processing will post the commands to the private SQ when a gap in the LBA is detected. The zone gap processing module will continue to post commands to the private SQ until a command that fills the gap is detected. At that point, the private SQ will be read and processed. The system 400 also handles the case where additional gaps may occur when the commands are being posted to the private SQ.

When the data storage device receives a command which is not the least significant LBA or the lowest LBA. The command is put into the private SQ that the data storage device controls, so later the controller can re-fetch the command. User data is normally very large, each single LBA is 4K. Instead of that single LBA, the data storage device will keep the actual command and each command is only 64 bytes.

When the controller receives a command which is not the next command that the data storage device is waiting for, the controller will write the command into the private SQ. For example, if the data storage device receives a first gap LBA from the host. The controller will scan the private SQ for a command from LBA 0. If there is no command for LBA 0, then the controller will scan the private SQ again but for a command containing LBA 1. The controller will continue this process until there is nothing else to pull from the private SQ.

In another example, if the commands of LBA 0 is already written, the command of LBA 3 is stored in the private SQ. The controller will receive another command containing LBA 2 and store the command of LBA 2 in the private SQ. If a first gap LBA (LBA 1) had been received, then the private SQ would be scanned to pull the command of LBA 2 and process the command of LBA 2. Since LBA 1 has not been received (LBA 0 has been received), the command of LBA 2 cannot be processed next, the zone gap processing will send the command of LBA 2 back to the private SQ. The controller will then pull the command of LBA 3 to see if the command of LBA 3 can be written. Since the command of LBA 3 is not next in the sequential order, the zone gap processing will send the command of LBA 3 back to the private SQ. When the command of LBA 1 is finally received, the controller will store LBA in the NVMe SQ. The controller will pull the command of LBA 1 from the NVMe SQ and process the command. The controller will then go pull the command of LBA 2 and see if the command of LBA 2 can be processed. Since the command of LBA 2 can be processed, the controller will process the command of LBA 2. The controller will continue these steps with the command of LBA 3.

FIG. 5 is a diagram illustrating a method 500 for gap processing, according to certain embodiments. The method 500 will maintain a current first gap variable that records only the first gap that is detected. The method 500 begins with the zone SQ empty. Specifically, the controller will check if received LBA (rx_Iba) equals the previous LBA plus one. If the previous LBA equals the previous LBA plus one, then re-queue command to HA. Else, if received LBA is not equal to the previous LBA plus one, then write command to zone SQ and set the current first gap to previous LBA plus one.

Else, if received LBA is equal to the current first gap, then forward command for normal processing, and the previous LBA is now equal to the previous LBA plus one. Forward zone SQ entry equal to one. For every entry on zone SQ (not including re-queued entry's), read entry or forward the entry to the zone SQ. If the SQ LBA is equal to the previous LBA plus one, then forward the command for normal processing. If previous LBA is equal to previous LBA plus one then send to zone SQ. Else, if current first gap is equal to previous LBA plus one, forward to the zone SQ if the entry is equal to zero, and write command to zone SQ.

Figure 6:
FIG. 6 is a block diagram illustrating a table for gap processing, according to one embodiment.

FIG. 6 is a block diagram illustrating a table 600 for gap processing, according to one embodiment. Table 600 has a column for RX LBA (received LBA), a process step, zone SQ entries, and cur first gap. The RX LBA lists the number of LBA that is received by the device. The process step describes what the controller will do based on the LBA received. The zone SQ entries describes what LBAs are stored in the private SQ. The cur first gap list what LBA the controller has to process before the LBA in that row is processed.

The table 600 is a step by step process of how to write commands using the new zone gap processing system. When commands come in order the commands will be processed in the sequential order. When a command comes in that is not in the sequential order, then the LBA of said command is stored in a private SQ. The controller will continue to receive commands and will checked the private SQ for the LBA that may be next in the sequential order. If there is an LBA in the private SQ that is next in the sequential order, then the controller will process the command. If the controller pulls an LBA from the private SQ that is not next in the sequential order, then the zone gap processing will put the LBA back in the private SQ.

For example once LBA 8 is received, LBA is going to be written to the zone SQ (private SQ). LBA 8 will be in the zone SQ with LBA 7 at the time LBA 8 is received. Both LBA 7 and LBA 8 are waiting for LBA 6 to be received by the controller. The table 600 receives LBA 9 before receiving LBA 6, so LBA 9 will be stored in the zone SQ with LBA 7 and LBA 8. Once LBA 6 is received, the controller will process LBA 7, LBA 8, and LBA 9 in sequential order.

Figure 7:
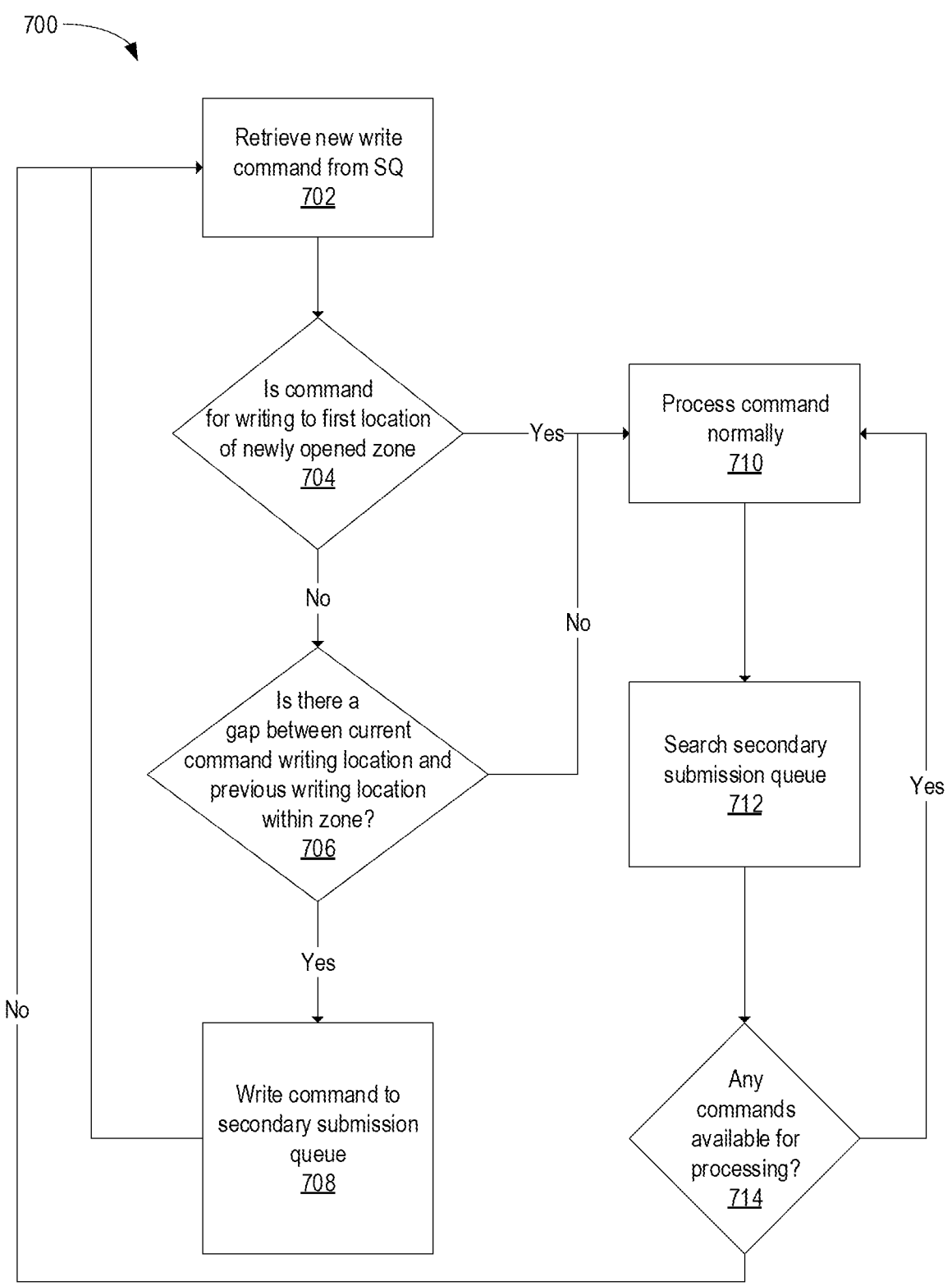
FIG. 7 is a flowchart illustrating a method for gap processing, according to certain embodiments.

FIG. 7 is a flowchart illustrating a method 700 for gap processing, according to certain embodiments. The method 700 begins at block 702. At block 702, the controller retrieves a new write command from the normal NVMe SQ. At block 704, the controller determines whether the new write command is for writing to a first location of a newly opened zone. If the controller determines that the new command is not writing to the first location of the newly opened zone, then the method 700 proceeds to block 706. At block 706, the controller determines whether there is a gap between the current command writing location and the previous writing location within the zone. If the controller determines that there is a gap between the current command writing location and the previous writing location within the zone, then the method 700 proceeds to block 708. At block 708, the controller write the new command to a secondary SQ and the method returns to block 702. If the controller determines that there is not a GAP between the current command writing location and the previous writing location within the zone, then the method 700 proceeds to block 710.

If the controller determines that the new command is writing to the first location of the newly opened zone, then the method 700 proceeds to block 710. At block 710, the command is processed normally. At block 712, the controller searches the secondary SQ. At block 714, the controller determines whether any commands are available for processing. If the controller determines that there are commands available for processing, then the method 700 returns to block 710. If the controller determines that there are no commands available for processing, then the method 700 returns to block 702.

Gap processing using private SQs that are external to the controller keeps internal resources from being used for commands that are "on hold" pending the gap being filled and commands being released from hold. The use of private SQ has the additional benefit of no additional custom processing as an NVMe compliant mechanism is used.

In one embodiment, a data storage device comprises: a memory device; and a controller coupled to the memory device, wherein the controller is configured to: retrieve a first zone write command from a first submission queue (SQ) to write data to a zone, wherein the first zone write command comprises a first logical block address (LBA);

determine that the first zone write command would result in a LBA gap within the zone; place the first zone write command in a second SQ; and retrieve a second zone write command from the first SQ, wherein the second zone write command comprises a second LBA. The controller is further configured to: execute the second zone write command; and search the second SQ for zone write commands that can be processed without resulting in a LBA gap. The controller is further configured to execute the first zone write command. The controller is further configured to write the data for the zone to the memory device. The controller is configured to assign a command index to the first zone write command, parse the first zone write command, and assign the zone to the first write command. The controller is configured to perform zone gap processing after assigning the zone to the first zone write command. Zone gap processing comprises determining whether writing to the zone would result in the LBA gap. The second SQ is a private SQ disposed in DDR memory. The second SQ is searched after detecting that a zone write command fills the LBA gap. The first SQ and the second SQ are external to the controller. External to the controller comprises a storage location distinct from the memory device. The external storage location is a host memory buffer (HMB).

In another embodiment, a data storage device comprises: a memory device; and a controller coupled to the memory device, wherein the controller is configured to: retrieve a first zone write command comprising a first logical block address (LBA); execute the first zone write command; retrieve a second zone write command comprising a second LBA; determine that execution of the second zone write command would be out of order; place the second zone write command in a submission queue (SQ); retrieve a third zone write command comprising a third LBA; execute the third zone write command; retrieve the second zone write command; and execute the second zone write command. The controller is further configured to search the SQ for additional zone write commands to execute. The searching occurs after executing any zone write command. The SQ is a distinct location from where the first zone write command is retrieved. The distinct location is a location external to the controller and distinct from the memory device.

In another embodiment, a data storage device comprises: means to store data; and a controller coupled to the means to store data, wherein the controller is configured to: determine whether a zone write command create a logical block address (LBA) gap within a zone; place the zone write command in a submission queue (SQ); process other zone write commands; search the SQ for zone write commands that can be executed without creating a LBA gap; and execute zone write commands from the SQ that can be executed without creating a LBA gap. Processing other zone write commands comprises executing zone write commands that can be executed without creating a LBA gap and without being placed in the SQ. The controller is configured to search the SQ after execution of any zone write command.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
  a memory device; and
  a controller coupled to the memory device, wherein the
    controller is configured to:

retrieve a first zone write command from a first submission queue (SQ) of a host device to write data to a zone, wherein the first zone write command comprises a first logical block address (LBA);

determine that the first zone write command would result in a LBA gap within the zone;

place the first zone write command in a second SQ, wherein the second SQ is stored external to the controller and configured to be private to the zone; and retrieve a second zone write command from the first SQ, wherein the second zone write command comprises a second LBA.

2. The data storage device of claim 1, wherein the controller is further configured to:

execute the second zone write command; and search the second SQ for zone write commands that can be processed without resulting in a LBA gap.

3. The data storage device of claim 2, wherein the controller is further configured to execute the first zone write command.

4. The data storage device of claim 3, wherein the controller is further configured to write the data for the zone to the memory device.

5. The data storage device of claim 1, wherein the controller is configured to assign a command index to the first zone write command, parse the first zone write command, and assign the zone to the first zone write command.

6. The data storage device of claim 5, wherein the controller is configured to perform zone gap processing after assigning the zone to the first zone write command.

7. The data storage device of claim 6, wherein zone gap processing comprises determining whether writing to the zone would result in the LBA gap.

8. The data storage device of claim 1, wherein the second SQ is a private SQ disposed in DDR memory.

9. The data storage device of claim 1, wherein the second SQ is searched after detecting that a zone write command fills the LBA gap.

10. The data storage device of claim 1, wherein the first SQ and the second SQ are stored in an external storage location distinct from the memory device.

11. The data storage device of claim 10, wherein the external storage location is a host memory buffer (HMB).

12. The data storage device of claim 1, wherein the controller is configured to:

indicate a gap variable of the first zone write command based on the determination, wherein the gap variable of the first zone write command identifies a LBA that fills the LBA gap; and search the second SQ for a zone write command comprising a LBA that fills the LBA gap.

13. The data storage device of claim 12, wherein the controller is configured to continue indicating the gap variable of the first zone write command for write commands to write data to the zone received after the first zone write command until the LBA gap is filled.

14. A data storage device, comprising:

a memory device; and a controller coupled to the memory device, wherein the controller is configured to:

retrieve a first zone write command having a first logical block address (LBA) from a first submission queue (SQ) of a host device to write data to a zone;

execute the first zone write command;

retrieve a second zone write command having a second LBA from a second SQ of a second host device to write to the zone;

determine that execution of the second zone write command would be out of order within the zone;

place the second zone write command in a third SQ, wherein the third SQ is distinct from the first and second SQ, stored external to the controller, and configured to be private to the zone;

retrieve a third zone write command having a third LBA;

execute the third zone write command;

retrieve the second zone write command; and execute the second zone write command.

15. The data storage device of claim 14, wherein the controller is further configured to search the third SQ for additional zone write commands to execute.

16. The data storage device of claim 15, wherein the searching occurs after executing any zone write command.

17. The data storage device of claim 14, wherein a location of third SQ is further distinct from the memory device, and wherein the location is a host memory buffer (HMB).

18. A data storage device, comprising:

means to store data; and a controller coupled to the means to store data, wherein the controller is configured to:

determine whether a zone write command retrieved from a host device creates a logical block address (LBA) gap within a zone;

place the zone write command in a submission queue (SQ), wherein the SQ is stored in a host memory buffer (HMB) of the host device and configured to be private to the zone;

process other zone write commands;

search the SQ for zone write commands that can be executed without creating a LBA gap; and execute zone write commands from the SQ that can be executed without creating a LBA gap.

19. The data storage device of claim 18, wherein processing other zone write commands comprises executing zone write commands that can be executed without creating a LBA gap and without being placed in the SQ.

20. The data storage device of claim 18, wherein the controller is configured to search the SQ after execution of any zone write command.

* * * * *